United States Patent [19]
Aufrere et al.

[11] Patent Number: 5,733,005
[45] Date of Patent: Mar. 31, 1998

[54] VEHICLE SEAT HAVING A HEIGHT- AND LENGTH-ADJUSTABLE SEAT PART

[75] Inventors: Christophe Aufrere, Marcoussis; Bruno Hamelin, Combs la Ville, both of France

[73] Assignee: Bertrand Faure Equipements SA, Boulogne, France

[21] Appl. No.: 650,517

[22] Filed: May 20, 1996

[30] Foreign Application Priority Data

May 23, 1995 [FR] France .................. 95 06121

[51] Int. Cl.$^6$ .................................. B60N 2/00
[52] U.S. Cl. ........................ 297/340; 297/284.1
[58] Field of Search ...................... 297/316–318, 297/322, 284.1, 284.11, 340, 344.1, 344.12, 344.14, 344.15, 344.11

[56] References Cited

U.S. PATENT DOCUMENTS

| | | | |
|---|---|---|---|
| 4,767,157 | 8/1988 | Kazaoka et al. | |
| 4,834,333 | 5/1989 | Saito et al. | 297/344.14 X |
| 5,145,232 | 9/1992 | Dal Monte | 297/322 X |
| 5,171,062 | 12/1992 | Courtois | |
| 5,358,308 | 10/1994 | Judic et al. | 297/340 X |
| 5,553,920 | 9/1996 | Meschkat et al. | 297/344.14 |

FOREIGN PATENT DOCUMENTS 0 235 793 9/1987 European Pat. Off. .
0 238 234 9/1987 European Pat. Off. .

*Primary Examiner*—Milton Nelson, Jr.
*Attorney, Agent, or Firm*—Larson & Taylor

[57] ABSTRACT

A vehicle seat includes a backrest and a seat part which is formed by a cushion secured to a first rigid armature itself supported by a second rigid armature on which the backrest is mounted, it being possible for the first armature to be moved back and forth with respect to the second armature and the second armature being supported by a raising mechanism. This raising mechanism includes at least one raising connecting piece having a driving portion which, with respect to the second armature, undergoes a backward relative movement when the seat part is moved up and a forward relative movement when the seat part is moved down, this driving portion being mechanically linked with the first armature.

6 Claims, 3 Drawing Sheets

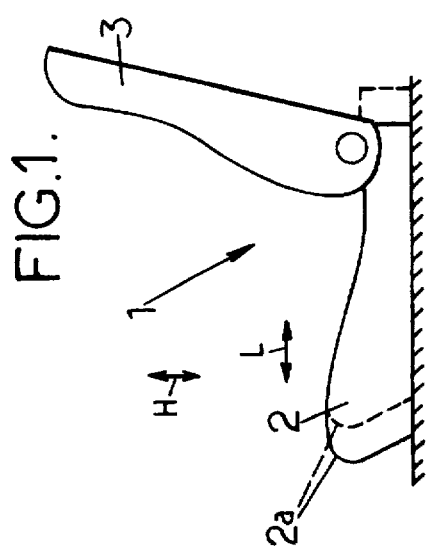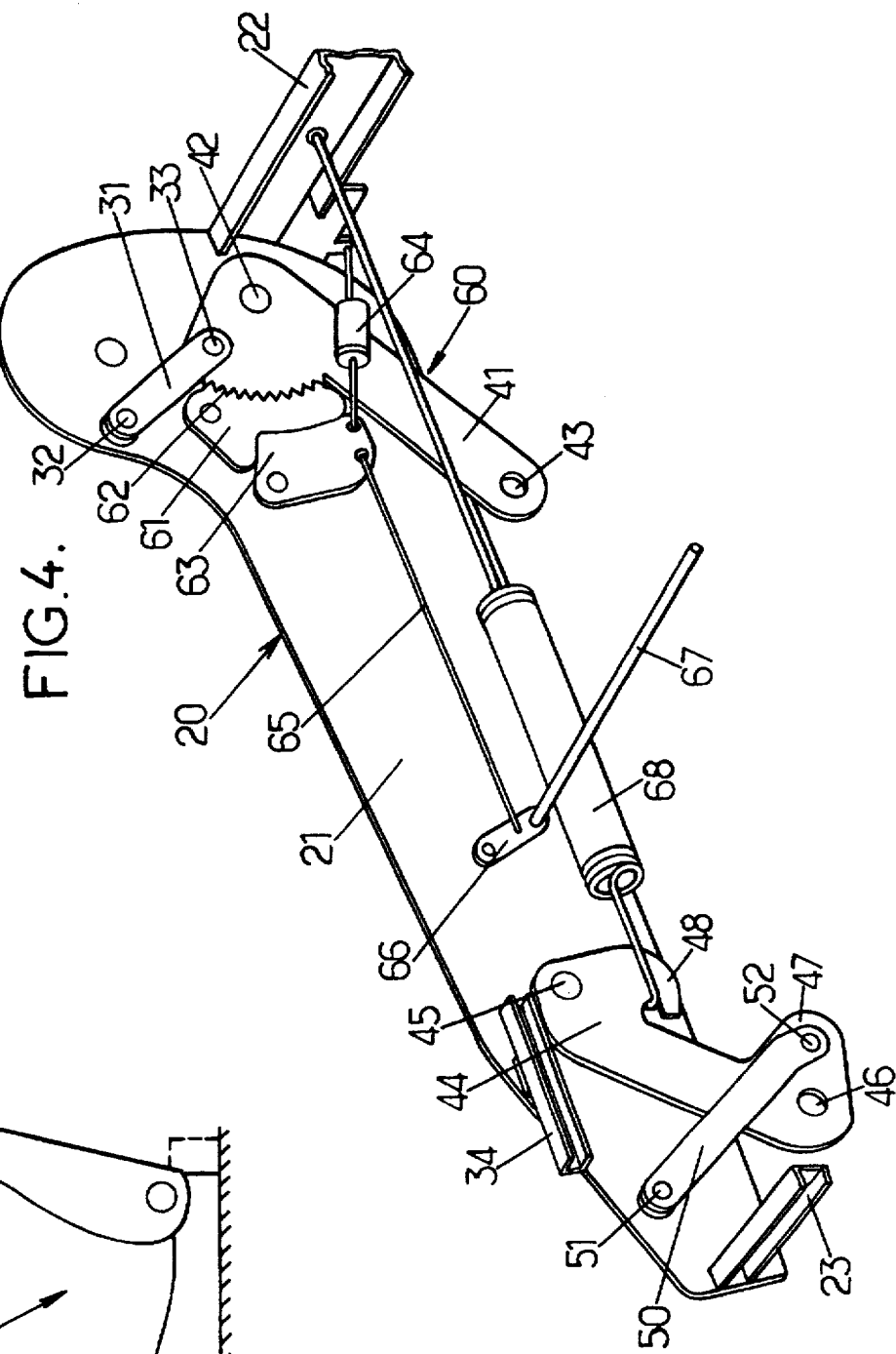

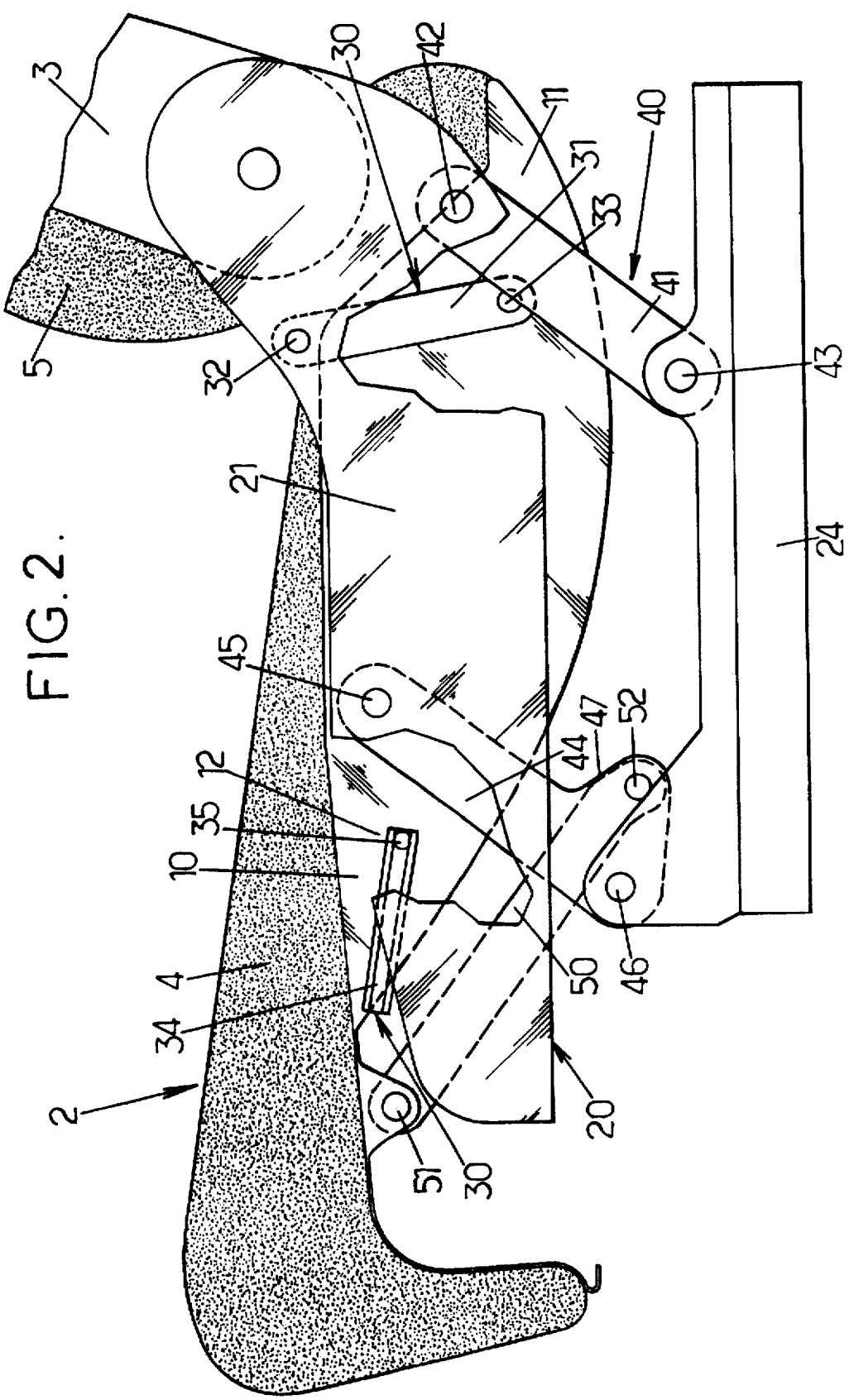

VEHICLE SEAT HAVING A HEIGHT- AND LENGTH-ADJUSTABLE SEAT PART

FIELD OF THE INVENTION

The present invention relates to vehicle seats, and in particular to motor vehicle front seats having a height- and length-adjustable seat part.

BACKGROUND OF THE INVENTION

Vehicle seats are known which include a backrest and a seat part which is formed by a cushion secured to a first rigid armature, the first armature being itself supported by a second rigid armature on which the backrest is mounted, it being possible for the first armature to be moved back and forth with respect to the second armature in a direction termed the longitudinal in order to vary the length of the seat part, and the second armature being supported by a raising mechanism for moving the seat part up or down.

These vehicle seats do, however, have the drawback of requiring the user of the seat to carry out two separate adjustments for the height and for the length of the seat part respectively, which means that the user generally does not bother with all the adjustments and is thus rewarded with imperfect comfort.

In order to overcome this drawback, the coupling of the adjustment of the length of the seat part with the adjustment of the height of the seat part is already known, this being achieved in particular by reducing the length of the seat part when the seat part of the seat is raised and increasing the length of the seat part when the seat part of the seat is lowered, this making it possible to alter the height and length of the seat part simultaneously with a single adjustment. Bearing in mind the correlations which there usually are between optimum seat part height and length adjustments, this single adjustment gives the user of the seat a high degree of comfort.

An example of a seat using such coupling is disclosed for example in the document EP-A-0 429 350.

However, known seats which have coupling between the seat part height and length adjustments have the drawback of being relatively complicated and expensive.

OBJECT AND BRIEF SUMMARY OF THE INVENTION

The object of the present invention is in particular to alleviate this drawback.

To this end, according to the invention, a vehicle seat of the sort in question is essentially one wherein the raising mechanism includes at least one rigid raising connecting piece which can be moved in terms of pivoting in a vertical plane parallel to the aforementioned longitudinal direction when the raising mechanism is actuated, this raising connecting piece including a portion, hereinafter termed the driving portion, which undergoes a backward relative movement with respect to the second armature when the raising mechanism moves the seat part up and which undergoes a forward relative movement with respect to the second armature when the raising mechanism moves the seat part down, and wherein the driving portion of the raising connecting piece is coupled to the first armature by a mechanical link in order to move said first armature backward relative to the second armature when the raising mechanism moves the seat part up, and to move the first armature forward relative to the second armature when the raising mechanism moves the seat part down.

Thus, the coupling between the seat part height and length adjustments is obtained simply by adding a mechanical link between the raising connecting piece and the first armature of the seat part, employing a conventional raising mechanism associated with a mechanism for adjusting the length of the seat part.

As a result, the seat according to the invention remains simple and inexpensive, whilst at the same time affording coupling between the seat part height and length adjustments, something which makes it possible to carry out these two adjustments in a single operation.

In preferred embodiments, recourse is further had to one and/or other of the following provisions:

- the mechanical link between the driving portion belonging to the raising connecting piece and the first armature consists of a rigid connecting piece which is mounted so that it can pivot on the one hand on said driving portion and on the other hand on the first armature;
- the raising connecting piece has an upper part which is mounted by means of a first pivot on the second armature and a lower part which is mounted by means of a second pivot on a support linked to the vehicle, the first and second pivots being aligned in a direction which is inclined downward and forward at least when the seat part is lowered as far as it will go, and the driving portion belonging to the raising connecting piece being situated lower down than the first pivot;
- the driving portion belonging to the raising connecting piece is close to the second pivot;
- the raising mechanism includes four raising connecting pieces, including the aforementioned raising connecting piece, these raising connecting pieces being arranged facing each other in pairs on either side of the seat;
- two of the raising connecting pieces arranged facing each other on either side of the seat are coupled to the first armature, each by an aforementioned mechanical link.

BRIEF DESCRIPTION OF THE DRAWINGS

Further features and advantages of the invention will become clear in the course of the following detailed description of one of its embodiments, given purely by way of nonlimiting example, with reference to the attached drawings.

In the drawings:

FIG. 1 is a diagrammatic view of a seat according to the invention,

FIG. 2 is a partial cutaway view of the seat of FIG. 1 when the seat part is as high as it will go, FIG. 4 is a part view in perspective representing one example of a locking mechanism that can be used in a seat like that of FIGS. 1 to 3.

MORE DETAILED DESCRIPTION

Figure 3:
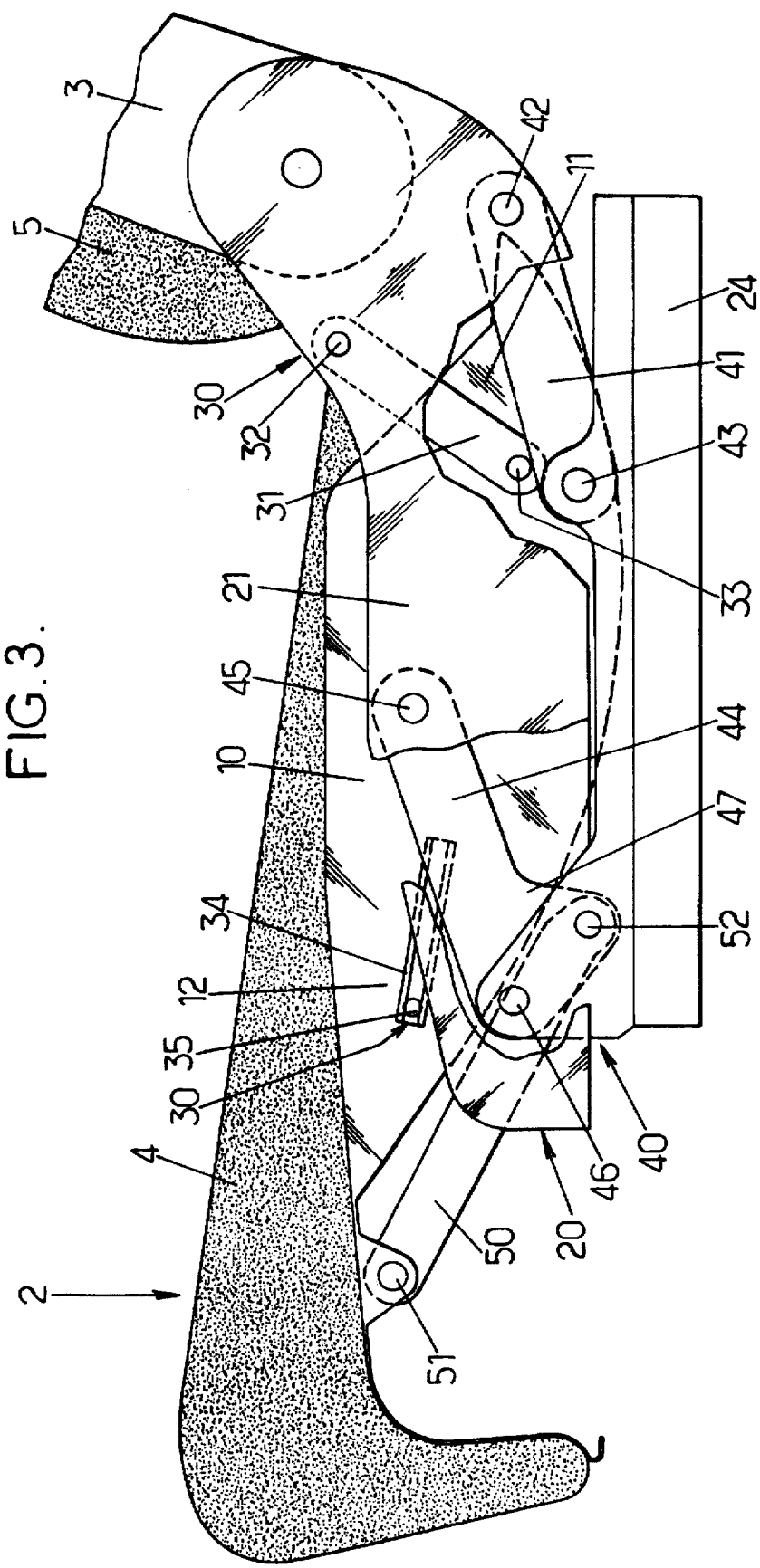
FIG. 3 is a view similar to FIG. 2 when the seat is as low as it will go.

In the various figures, the same references denote identical or similar elements.

As represented diagrammatically in FIG. 1, the invention relates to a vehicle seat 1, particularly a motor vehicle front seat.

This seat includes a seat part 2 and a backrest 3, generally mounted so that it can pivot with respect to the seat part.

The seat part 2 of the seat has an adjustable height, that is to say that it can be moved in a vertical direction H and it also has an adjustable length, that is to say that its front end 2a can be moved in a longitudinal direction L without moving the backrest 3.

The front end 2a of the seat part can thus be moved forward as far as an extreme position represented in solid line in FIG. 1, and backward as far as an extreme position represented in dotted line in FIG. 1.

The mechanism allowing the height and length of the seat part to be adjusted simultaneously is represented in greater detail in FIGS. 2 and 3 where it is possible to see that the cushion 4 forming the seat part of the seat is secured to a first rigid armature 10 here consisting of a sheet metal bucket.

This first armature 10 can be moved back and forth, with the rear part of the seat part cushion 4 sliding under the covering 5 of the backrest 3, so as to vary the length of the seat part 2.

The first armature 10 is supported by a second rigid armature 20 which includes in particular two metal cheeks 21 on either side of the seat, and two crossmembers, respectively a rear one 22 and a front one 23 linking the two cheeks 21 together.

The first armature is linked to the second armature by a seat part length adjustment mechanism 30 including:

two rear connecting pieces 31 arranged on either side of the seat, which suspend a rear part 11 of the first armature from the second armature 20, each connecting piece 31 being linked to a cheek 21 by an upper pivot 32 and to the first armature by a lower pivot 33, and two rails 34, fixed to the cheeks 21 on either side of the seat, each of the rails 34 being arranged horizontally or slightly inclined with respect to the horizontal and taking a roller 35 which is mounted on a front part 12 of the first armature and which is guided along said rail 34.

It will be noted that the seat part length adjustment mechanism 30 is not restricted to the example which has just been described and that in particular, the rear connecting pieces 31 could be replaced by a system of rails, and/or the rails 34 could be replaced by connecting pieces linking the first armature to the second armature.

Moreover, the second armature 20 is mounted by means of a raising mechanism 40 on rails 24 which allow the longitudinal position of the whole seat to be adjusted.

The raising mechanism 40 includes, in the conventional way:

two rear connecting pieces 41 arranged on either side of the seat and each mounted so that it can pivot on the one hand on the corresponding cheek 21 by means of an upper pivot 42 and on the other hand on the corresponding rail 24 by means of a lower pivot 43, and two front connecting pieces 44 arranged on either side of the seat and each one linked on the one hand to the corresponding cheek 21 by means of an upper pivot 45 and on the other hand to the corresponding rail 24 by means of a lower pivot 46.

As an option, the raising mechanism 40 could include two front connecting pieces 44 and two curved rails at the rear.

Even more generally, the raising mechanism 40 has to include at least one connecting piece, in order to achieve coupling with the seat part length mechanism 30 as will be explained later.

In the example under consideration the connecting pieces 41 and 44 are inclined forward and downward, and the height of the seat part is adjusted by varying the inclination of the rear connecting piece(s) 41 and front connecting piece(s) 44, these connecting pieces being more steeply inclined with respect to the horizontal when the seat part 2 of the seat is as high as it will go, as represented in FIG. 2, and less steeply inclined with respect to the horizontal when the seat part 2 of the seat is as low as it will go, as represented in FIG. 3.

As a result, all those parts of the connecting pieces 41 and 44 which are situated below their respective upper pivots 42 and 45 undergo a backward relative movement with respect to the second armature 20 when the seat part 2 is moved up, and a forward relative movement with respect to said second armature when the seat part 2 is moved down.

The relative movement is employed to cause a relative movement of the first armature 10 with respect to the second armature 20, backward when the seat part 2 of the seat is moved up, and forward when the seat part 2 is moved down: in other words, the length of the seat part reduces when the seat part is moved up and increases when the seat part is moved down.

To achieve this, the first armature 10 is coupled to the lower part of each of the front connecting pieces 44 by means of a connecting piece 50 which is linked to the first armature 10 by an upper pivot 51 and which is linked to a lower part 47 of said front connecting piece 44 by a lower pivot 52.

In the example represented, the lower part 47 of the connecting piece 44 forms a crank which projects backward, but the lower pivot 52 could be mounted on the connecting piece 44 at any other point arranged below the upper pivot 45, the fixing point for the pivot 52 being determined by the seat part length adjustment characteristics to be obtained as a function of the seat part height.

As an option, a single connecting piece 50 could be provided which couples the first armature 10 to the lower part 47 of just one of the front connecting pieces 44.

It goes without saying that instead of providing connecting pieces 50 between the first armature 10 and the front connecting pieces 44, these connecting pieces 50 could optionally be mounted between the first armature 10 and the lower part of the rear connecting pieces 41. In this case too, it is possible to provide just one connecting piece 50.

In the example represented in FIGS. 2 and 3, it will be observed that the front end 2a of the seat part moves back slightly with respect to the rails 24 when the seat part is moved up, and moves forward slightly with respect to the rails when the seat part is moved down.

The arrangement could, however, be different, provided that the length of the seat part decreases when the seat part is moved up and increases when the seat part is moved down.

The combined seat part height and length adjustment may optionally be effected by a mechanism which positively causes movement of the raising mechanism 40 or of the seat part length adjustment mechanism 30, it being possible for this positive-action mechanism to be driven either manually or by an electric motor.

Moreover, the height and length of the seat part could instead be adjusted by acting directly on the seat after disengaging a locking device 60 like the one represented diagrammatically in FIG. 4.

In the example represented in FIG. 4, the locking device includes, on just one side or on both sides of the seat, a toothed locking piece 61 which interacts with a corresponding toothed sector 62 belonging to the rear connecting piece 41 situated on the same side of the seat.

The lock 61 is mounted so that it can pivot on the cheek 21 between a blocking position in which it immobilizes the rear connecting piece 41, and a non-obstructing position in which it allows this connecting piece to pivot.

A cam 63 which is also mounted so that it can pivot on the cheek 21 is urged elastically by a spring 64 toward the locking piece 61, pressing it into its blocking position, and this cam can be moved away from the locking piece 61 thereby allowing this locking piece to come into its nonobstructing position.

This actuation of the cam 63 is obtained by means of a linkage 65 actuated by a lever 66 which is controlled by a knob or the like (not represented) accessible to a user of the seat.

When two locking devices 60 are provided on either side of the seat, the two levers 66 which control the linkages 65 are preferably linked together by a rigid link rod 67 in order to synchronize the two locking devices.

Moreover, tensile springs 68 are generally mounted between the arms of levers 48 of the front connecting pieces 44 and the rear crossmember 22 so as to urge the seat part of the seat upward.

Thus, when a user wishes to move the seat part 2 of the seat up and simultaneously shorten this seat part, he or she unblocks the locking devices 60 by means of the aforementioned knob, after which the seat part of the seat moves down of its own accord under the weight of the user, or alternatively this seat part moves up under the effect of the springs 68 if the user takes his or her weight off the seat part by rising a little or pulling against the steering wheel or some other leverage point in the vehicle.

We claim:

1. A vehicle seat including a backrest and a seat part which is formed by a cushion secured to a first rigid armature, the first armature being itself supported by a second rigid armature on which the backrest is mounted, means for causing the first armature to be moved back and forth with respect to the second armature in a direction termed the longitudinal in order to vary the length of the seat part, and the second armature being supported by a raising mechanism for moving the seat part up and down, wherein the raising mechanism includes at least one rigid raising connecting piece which can be moved in terms of pivoting in a vertical plane parallel to the aforementioned longitudinal direction when the raising mechanism is actuated, this raising connecting piece including a portion, hereinafter termed the driving portion, which undergoes a backward relative movement with respect to the second armature when the raising mechanism moves the seat part up and which undergoes a forward relative movement with respect to the second armature when the raising mechanism moves the seat part down, and wherein the driving portion of the raising connecting piece is coupled to the first armature by a mechanical link in order to move said first armature backward relative to the second armature when the raising mechanism moves the seat part up, and to move the first armature forward relative to the second armature when the raising mechanism moves the seat part down.

2. The seat as claimed in claim 1, in which the mechanical link between the driving portion belonging to the raising connecting piece and the first armature consists of a rigid connecting piece which is mounted so that it can pivot on the one hand on said driving portion and on the other hand on the first armature.

3. The seat as claimed in claim 1, in which the raising connecting piece has an upper part which is mounted by means of a first pivot on the second armature and a lower part which is mounted by means of a second pivot on a support linked to a vehicle, the first and second pivots being aligned in a direction which is inclined downward and forward at least when the seat part is lowered as far as it will go, and the driving portion belonging to the raising connecting piece being situated lower down than the first pivot.

4. The seat as claimed in claim 3, in which the driving portion belonging to the raising connecting piece is close to the second pivot.

5. The seat as claimed in claim 1, wherein the raising mechanism includes four raising connecting pieces, including the aforementioned raising connecting piece, these raising connecting pieces being arranged facing each other in pairs on either side of the seat.

6. The seat as claimed in claim 5, in which two of the raising connecting pieces arranged facing each other on either side of the seat are coupled to the first armature, each by an aforementioned mechanical link.

* * * * *